(No Model.) 5 Sheets—Sheet 1.
H. EHRHARDT.
UNIVERSAL TURNING RADIAL SAW.
No. 543,574. Patented July 30, 1895.
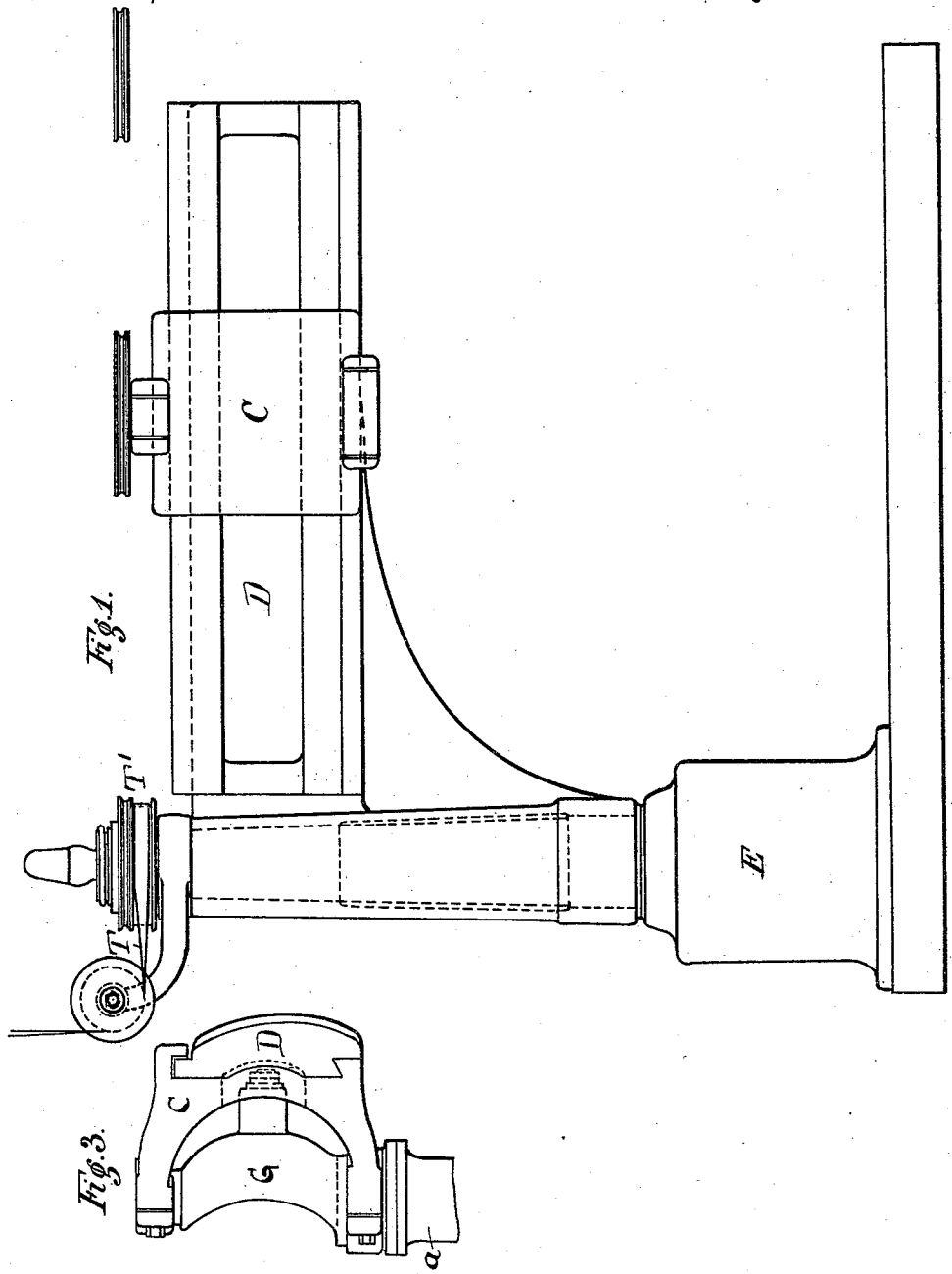
Witnesses:
Inventor:
Heinrich Ehrhardt,
by A. Faber du Faur,
Attorney.

(No Model.) 5 Sheets—Sheet 2.
H. EHRHARDT.
UNIVERSAL TURNING RADIAL SAW.
No. 543,574. Patented July 30, 1895.
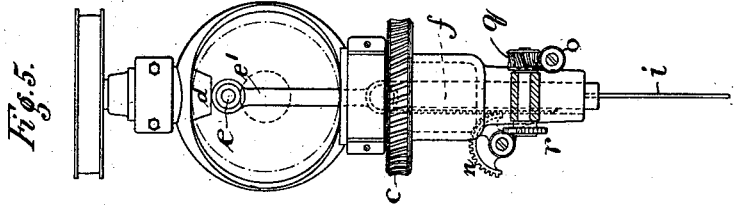
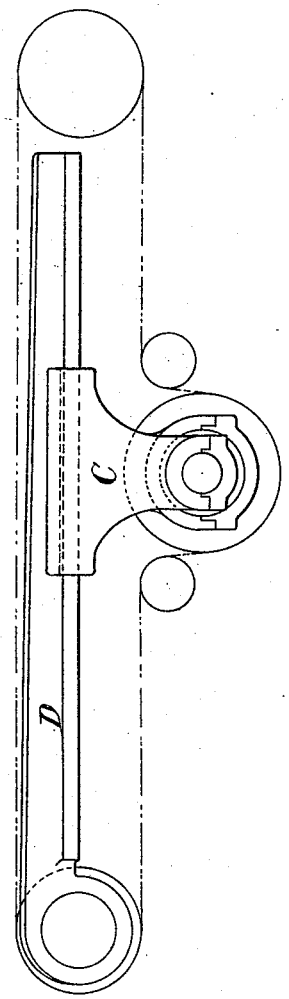
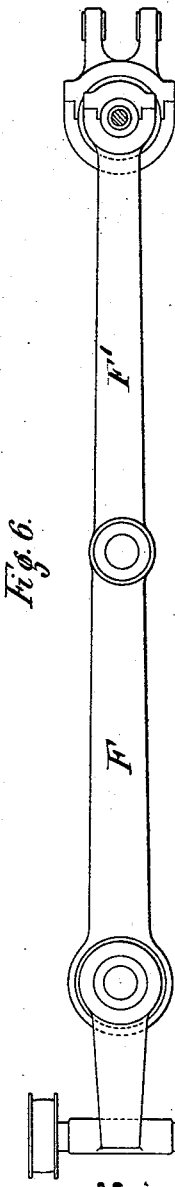
Witnesses:
Klas N. Ternstedt
J. J. Malle
Inventor:
Heinrich Ehrhardt,
by A. Faber du Faur Jr.
Attorney (No Model.) H. EHRHARDT. 5 Sheets—Sheet 3.
UNIVERSAL TURNING RADIAL SAW.

No. 543,574. Patented July 30, 1895.

Witnesses:
Klas H. Rinstedt
J. J. Malle

Inventor:
Heinrich Ehrhardt,
by A. Faber du Faur,
Attorney.

(No Model.) 5 Sheets—Sheet 4.
H. EHRHARDT.
UNIVERSAL TURNING RADIAL SAW.
No. 543,574. Patented July 30, 1895.
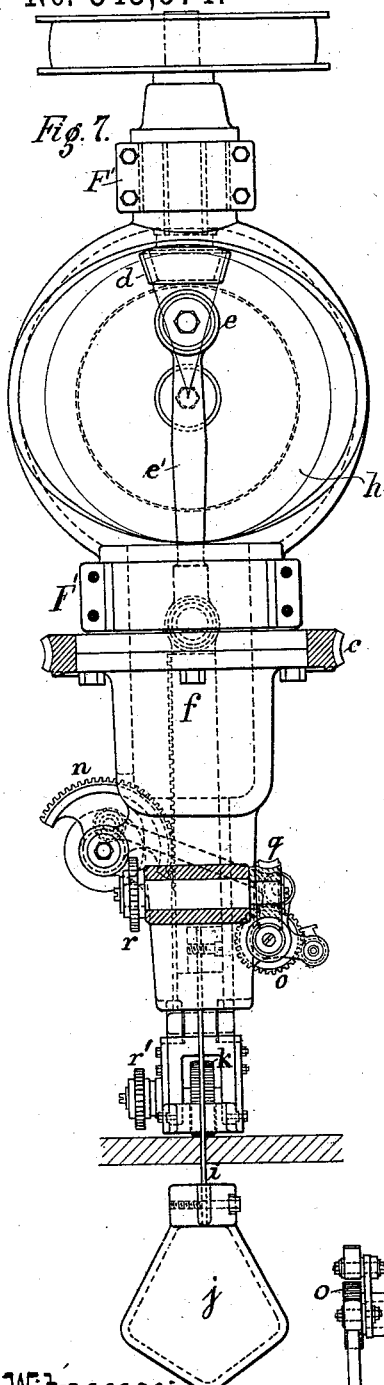
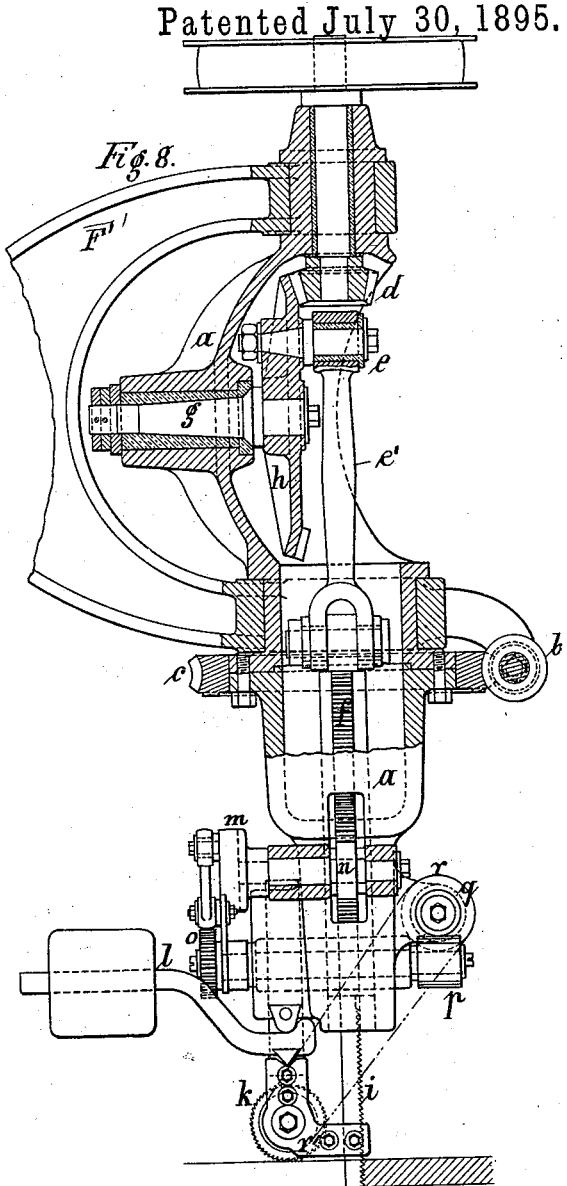
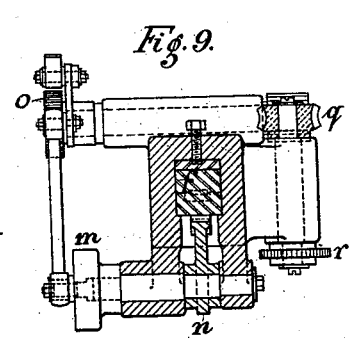
Witnesses:
Inventor:
Heinrich Ehrhardt,
by A. Faber du Faur,
Attorney.

(No Model.) 5 Sheets—Sheet 5.

H. EHRHARDT.
UNIVERSAL TURNING RADIAL SAW.

No. 543,574. Patented July 30, 1895.

Witnesses:
Lao. W. Thomas
Eugenie A. Persides.

Inventor:
Heinrich Ehrhardt,
by A Faber du Faur
Atty.

UNITED STATES PATENT OFFICE.

HEINRICH EHRHARDT, OF DÜSSELDORF, GERMANY.

UNIVERSAL TURNING RADIAL SAW.

SPECIFICATION forming part of Letters Patent No. 543,574, dated July 30, 1895.

Application filed May 6, 1893. Serial No. 473,251. (No model.)

*To all whom it may concern:*

Be it known that I, HEINRICH EHRHARDT, a subject of the Duke of Saxe-Coburg-Gotha, residing at Düsseldorf, in the Kingdom of Prussia, German Empire, have invented new and useful Improvements in Universal Radial Turning Saws, of which the following is a specification.

My invention has reference to improvements in jig-saws, and especially to that class adapted for sawing sheet metal.

It has for its object to facilitate the operation of the machine and the production of work requiring little or no retouching after it leaves the saw.

To this end my invention consists, essentially, in combining with a saw-blade mounted in a universal head a device adapted to automatically and accurately feed the saw-blade in any desired direction or curve, and also in combining with the above-mentioned parts two independent tables constructed for the support of the work and provided with weighted levers adapted to exert pressure against the work.

The nature of my invention will best be understood when described in connection with the accompanying drawings, in which—

Figure 4:
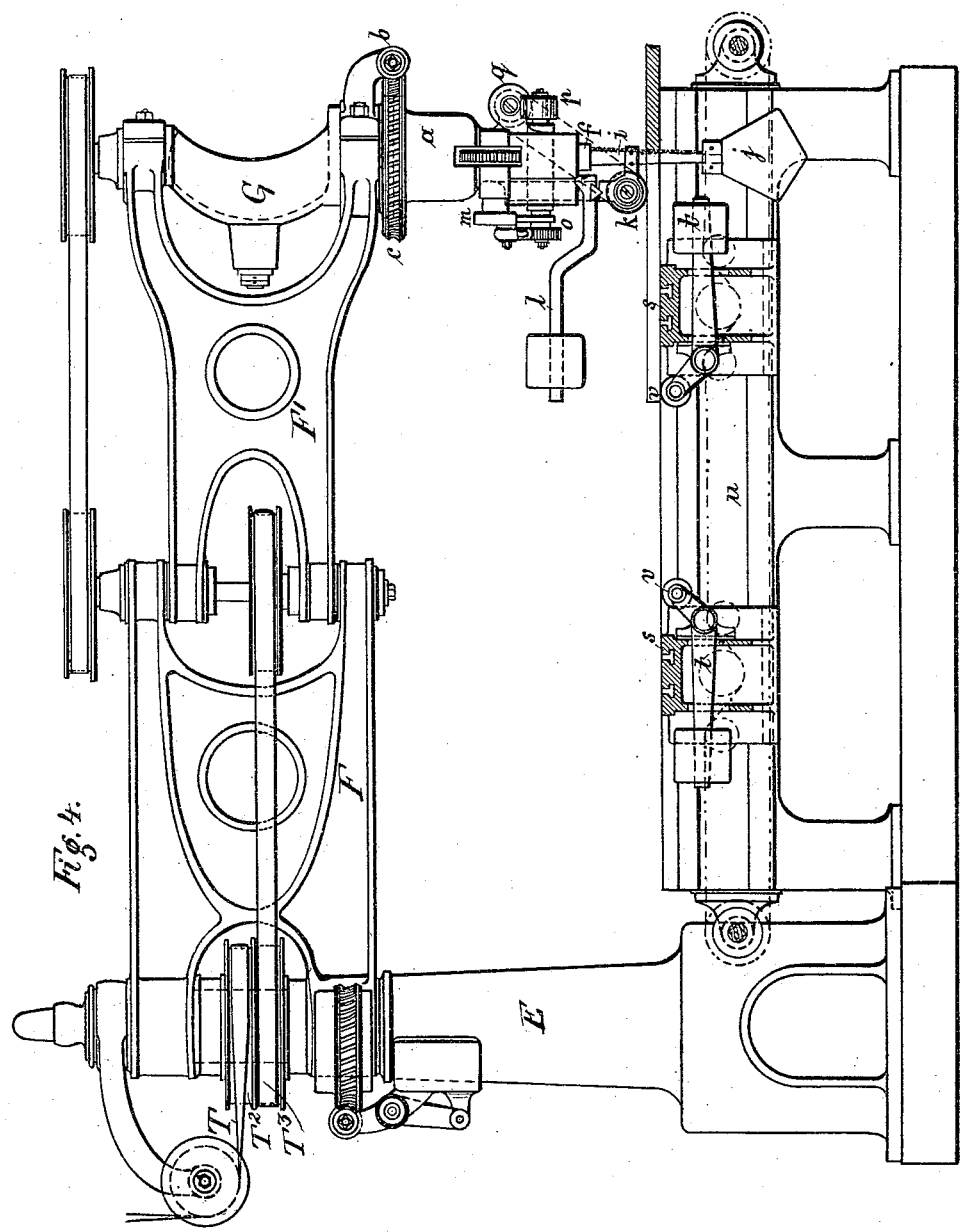
Figure 10:
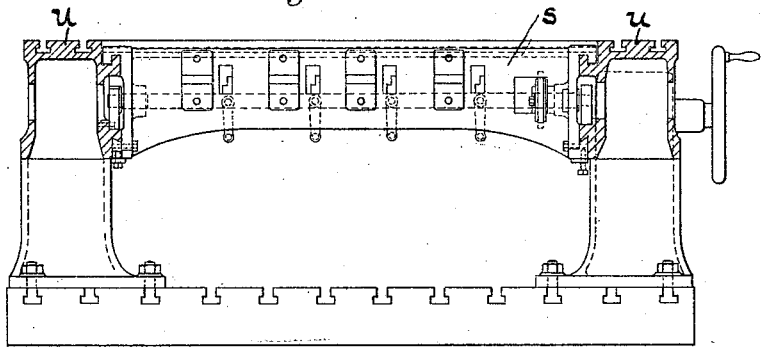
Figure 11:
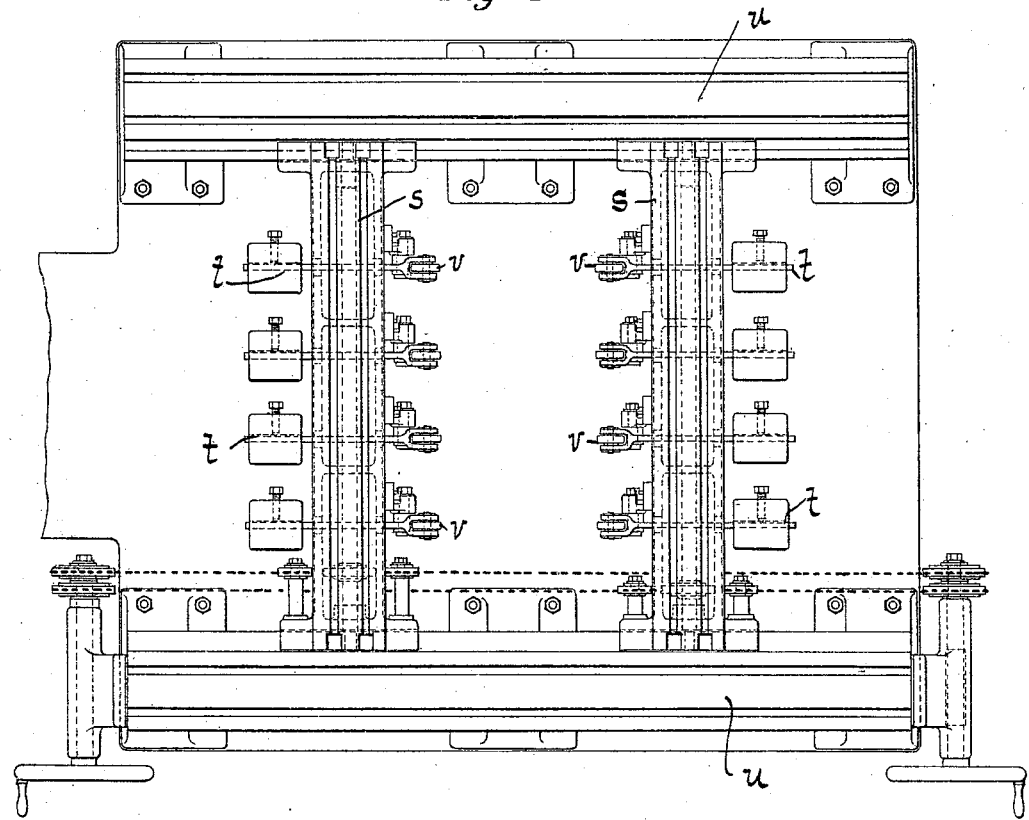

Figure 1 represents a side elevation of one form of universal frame to which my improved devices can be applied. Fig. 2 is a plan or top view of the same. Fig. 3 is an end elevation of Fig. 1, part being broken away. Fig. 4 is a side elevation, partly in section, of a second form of a universal frame with my improvements applied. Fig. 5 is an end view thereof, the bed and tables being omitted. Fig. 6 is a plan or top view of the frame-levers. Fig. 7 is a front elevation on a larger scale than the preceding figures. Fig. 8 is a sectional side elevation of Fig. 7. Fig. 9 is a horizontal section through the saw-clamp and adjacent parts. Fig. 10 is a rear elevation, partly in section, illustrating the work-tables. Fig. 11 is a plan or top view of the same, part being broken away.

Similar letters of reference designate corresponding parts.

In applying my invention, in practice I make use of a suitable universal frame in order that the saw may be free to move either in a straight or in a curved line.

In Fig. 1 I have shown a universal frame in which E is a vertical column, D is a radial arm journaled thereto and carrying a movable slide C, in which the head G is mounted, and T T' are the driving belt and pulley.

In Figs. 4, 5, and 6 I have shown a column E, to which is fulcrumed a radial arm F to which in turn is pivoted a second arm F', supporting the vertical head G. T is the driving-belt and $T^2$ and $T^3$ the pulleys.

I will now proceed to describe the feeding apparatus, reference being had especially to Figs. 7, 8, and 9.

The head G is journaled in the forked end of the arm F and can be rotated by hand by means of a worm-wheel $c$ and a worm $b$, the latter having bearings in brackets secured to the arm F. In said head G is mounted, to reciprocate vertically, a saw-clamp $f$. This saw-clamp is actuated from a bevel-wheel $h$, to which it is connected by the crank-pin $e$ and connecting-rod $e'$. The wheel $h$ is driven by a bevel-gear $d$ passing through the upper journal of the head and rotated by a belt-and-pulley connection with the rotary spindle connecting the two arms F F'. To the lower end of the saw-blade is attached a weight $j$ for holding the same taut.

Directly back of the saw-blade is located a toothed feed-wheel $k$ having its surface crowned and adapted to run along the line of the kerf, or, if desired, on one side of the same. The said wheel is mounted in a forked bar guided vertically in the lower portion of the head G and having its lower portion bifurcated and provided with means for guiding the saw-blade. The block, and consequently the toothed feed-wheel $k$, is acted upon by a weighted lever $l$, tending to force the wheel downward against the work. Upon the face of the saw-clamp $f$ is formed a rack engaging a segment $n$. On the shaft of the segment $n$ is secured a crank-disk $m$, which operates a pawl engaging with the gear-wheel $o$. Upon the opposite end of the shaft of said gear-wheel $o$ is mounted a worm $p$, engaging a worm-wheel $q$, upon the shaft of which latter is secured a chain-wheel $r$, connected by a chain $i$ with a chain-wheel $r'$, mounted on the spindle of the toothed feed-wheel $k$. The reciprocating motion of the saw-clamp is by this intermediate mechanism converted into a rotary motion of the feed-wheel $k$ in the direction of the work.

By the rotary motion of the feed-wheel the saw-blade is automatically fed in any desired direction or curve.

To facilitate the operation of the feeding device I provide two narrow, transverse work-tables $s$, Figs. 4, 10, and 11, extending parallel to each other and adapted to be moved independently of each other in suitable ways formed in the longitudinal frames or tables $u$. Each of the work-tables $s$ is provided with a series of weighted levers $t$ carrying at their ends roller-studs $v$ adapted to press against the sheet or plate and to stretch the same. The work-tables are operated by suitable hand-wheels mounted at opposite ends of the bed in connection with chains passing over suitable pulleys on the tables.

What I claim as new is—

1. A universal jig saw comprising in its construction, a swinging frame, a head mounted therein, a reciprocating saw clamp, a weighted saw blade secured therein, and a toothed rotary feed wheel mounted adjacent to the saw blade and operated from the saw clamp, substantially as described.

2. A universal jig saw comprising in its construction a swinging frame, a head mounted therein, a reciprocating saw clamp, a weighted saw blade secured therein, and a toothed feed wheel under pressure mounted adjacent to the saw blade, substantially as and for the purpose set forth.

3. A universal jig saw comprising in its construction a swinging frame, a head mounted therein, a saw clamp, a bevel wheel crank mechanism for reciprocating the saw clamp, a weighted saw blade secured in the saw clamp, a toothed feed wheel mounted adjacent to the saw blade, means substantially as described for operating the feed wheel, two independent work-tables, and weighted levers mounted on the same and bearing against the work, substantially as described.

In testimony whereof I have signed my name to this specification in the presence of two subscribing witnesses.

HEINRICH EHRHARDT.

Witnesses:
   SOREN LISTOE,
   C. D. SCHAAFF.